United States Patent
Wensel et al.

(10) Patent No.: US 6,528,002 B1
(45) Date of Patent: Mar. 4, 2003

(54) PREFORMED ENCLOSURE FOR A CUSHION

(75) Inventors: John D. Wensel, Sullivan, MO (US); Lee Denny, Kansas City, MO (US); Karen Barber, Lenexa, KS (US); Rob P. Dieckhaus, Eureka, MO (US)

(73) Assignees: Cramer, Inc., Kansas City, KS (US); Meramec Group, Inc., Sullivan, MO (US)

( * ) Notice: Subject to any disclaimer, the term of this patent is extended or adjusted under 35 U.S.C. 154(b) by 0 days.

(21) Appl. No.: 09/494,383

(22) Filed: Jan. 31, 2000

(51) Int. Cl.⁷ .................................................. B28B 1/14
(52) U.S. Cl. .................. 264/299; 29/91.1; 297/DIG. 1; 297/DIG. 2
(58) Field of Search .......................... 29/91.1; 264/299; 297/DIG. 1, DIG. 2

(56) References Cited

U.S. PATENT DOCUMENTS

| | | | |
|---|---|---|---|
| 2,725,923 A | 12/1955 | Bachrach | |
| 2,845,997 A | * 8/1958 | Waite | |
| 3,353,867 A | 11/1967 | Anderson | |
| 3,408,106 A | 10/1968 | Bolling et al. | |
| 3,431,023 A | 3/1969 | Anderson | |
| 3,612,607 A | 10/1971 | Lohr | |
| 3,616,171 A | 10/1971 | Hoskinson | |
| 3,669,496 A | 6/1972 | Chisholm | |
| 3,713,697 A | 1/1973 | Koepke | |
| 4,385,783 A | 5/1983 | Stephens | |
| 4,566,735 A | 1/1986 | Frobose | |
| 4,647,109 A | 3/1987 | Christophersen et al. | |
| 4,768,833 A | 9/1988 | Virtue | |
| 4,806,094 A | * 2/1989 | Rhodes, Jr. et al. | |
| 4,867,508 A | 9/1989 | Urai | |
| 4,987,666 A | * 1/1991 | Smith | |
| 5,067,772 A | 11/1991 | Koa | |
| 5,338,091 A | 8/1994 | Miller | |
| 5,400,490 A | * 3/1995 | Burchi | |
| 5,462,339 A | 10/1995 | Schmale et al. | |
| 5,468,434 A | * 11/1995 | Powell et al. | |
| 5,542,747 A | 8/1996 | Burchi | |
| 5,599,608 A | * 2/1997 | Yamamoto et al. | |
| 5,609,395 A | 3/1997 | Burch | |
| 5,704,691 A | 1/1998 | Olson | |
| 6,226,819 B1 | * 5/2001 | Ogawa et al. | |
| 6,245,264 B1 | * 6/2001 | Krause et al. | |

* cited by examiner

Primary Examiner—Milton Nelson, Jr.
(74) Attorney, Agent, or Firm—Stinson Morrison Hecker LLP

(57) ABSTRACT

A seating cushion for use as a seat bottom, back, headrest, arm or the like in a seating product. The seating cushion comprises an outer enclosure formed of a relatively durable and inert polymer and a resilient inner pad fitted within the enclosure. The outer enclosure is preformed of a three dimensional unitary polymeric wall configured to receive the inner pad so as to cover the top, sides and at least a portion of the bottom of the pad. The preformed enclosure may be used in place of conventional upholstery in most seating products. The wall of the enclosure is generally thicker than conventional upholstery material so as to provide durability and structure, but is sufficiently thin and flexible to enable the user to feel the comfort of the pad disposed within the enclosure. The enclosure is preferably formed of polyurethane molded in a two-sided mold to provide a three dimensional enclosure of controlled thickness.

16 Claims, 4 Drawing Sheets

PREFORMED ENCLOSURE FOR A CUSHION

BACKGROUND OF THE INVENTION

1. Field of the Invention

The present invention is generally directed to seating products, and is more particularly directed to a seating cushion comprised of a preformed polymeric three-dimensional enclosure configured to receive a resilient inner pad so as to cover the top, sides and at least a portion of the bottom of the pad. The seating cushion is particularly well suited for industrial and vehicular seating products.

2. Description of Related Art

Seating products such as chairs, stools and benches are commonly subjected to heavy wear and often times nearly continuous use, particularly in industrial or vehicular settings. In these and other environments, users may spill food, beverages, chemicals or other damaging materials onto the seating product. In such environments, seating products made from conventional upholstery materials must be repaired or replaced frequently, which can be quite expensive. Thus, there is a need for durable seating products that can withstand heavy use and spilled materials. In addition, in many industries, such as the pharmaceutical and microelectronics industries, there is a need for seating products that are not only durable, but are comprised of relatively inert materials suitable for use in a clean room environment. Unfortunately, because of the need for durable and/or inert seating products, comfort is often a secondary consideration in designing and purchasing these seating products.

Attempts to construct durable seating products suitable for clean room and other industrial use include providing solid molded polyurethane seat bottoms and backs. The solid polyurethane is highly durable and resists wear and spillage. In addition, the solid polyurethane is relatively inert and does not release particles that can contaminate a clean room environment. Although such seats are suitable for use in vehicles and clean rooms, the polyurethane is hard and uncomfortable. This can be a particular problem insofar as persons who work in clean rooms and other industrial settings are often required to remain seated for prolonged periods of time. Thus, use of solid polyurethane seating products can lead to unhappy workers, poor job performance and expenses related to health problems (e.g., back problems).

Other attempts to construct durable seating products have focused on vehicular seating products, such as seats or benches used in buses. U.S. Pat. No. 5,609,395 to Burch discloses bus seat modules comprised of an elastomeric skin bonded to a polyurethane foam interior and a plywood base. The bus seat modules are formed by coating the interior surface of a mold with a spray elastomer, inserting the plywood base into the mold and injecting urethane foam therebetween. The foam bonds to the skin and the plywood to form a unitary piece. Although the elastomeric skin may be durable, the method for spraying the elastomer into the mold expels harmful chemicals into the air and is difficult to control, resulting in wasted elastomer, overspray that requires clean-up, and inconsistencies in the thickness of the sprayed skin. Further, it is extremely difficult to position the spray gun to coat sharp angles or overhanging portions of the mold, and joining separately formed pieces of skin is generally unsatisfactory because overspray at the parting line makes joinder of the pieces difficult. Thus, the shape of the skin that may be produced utilizing spray elastomer is somewhat limited to shapes without overlapping walls or sharp angles.

Therefore, it is an object of the present invention to provide a durable seat cushion that can be utilized in heavy use environments, where the cushion is subjected to almost continuous usage, such as in industrial settings or for commercial vehicles.

It is a further object of the present invention to provide a durable seat cushion that can be easily cleaned and can withstand chemical spills.

It is another object of the present invention to provide a such a seat cushion that is as durable as conventional industrial seats, but is much more comfortable.

It is yet another object of the present invention to provide such a seat cushion that is suitable for use in clean rooms.

It is another object of the present invention to provide such a seat cushion that can be constructed accurately with predetermined characteristics.

It is another object of the present invention to provide such a seat cushion that can be constructed economically without significant waste.

SUMMARY OF THE INVENTION

The present invention is directed to a durable and relatively inert seating cushion comprising a preformed outer enclosure configured to cover and receive a resilient inner pad. The preformed enclosure is preferably three-dimensional and may be used in place of conventional upholstery in most seating products. The enclosure comprises a unitary polymeric wall that terminates in a lower peripheral edge to define an opening through which the pad can be inserted. Preferably, the wall comprises a substantially horizontal top wall, a peripheral side wall and a substantially horizontal bottom lip adjacent the lower peripheral edge. The bottom lip will cover a portion of the bottom surface of the pad contained within the enclosure.

The wall of the enclosure is relatively thick, which adds durability and structure to the seating cushion. However, the enclosure wall is sufficiently thin and of a density that allows the user to feel the characteristics of the pad contained within the enclosure. In a preferred embodiment, the enclosure is comprised of a unitary wall of polyurethane having a thickness of at least 0.030 inch, and a density ranging between 0.5 and 1.2 grams/cubic centimeter.

The enclosure is preferably formed by casting or injection molding using a two-sided mold. The two-sided mold allows the wall of the enclosure to be formed in a predetermined thickness, which thickness may vary at predetermined locations along the enclosure wall. In addition, a two-sided mold allows the enclosure to be formed with an overlapping bottom lip at the lower portion of the wall. After molding, a pad with the desired characteristics is inserted into the enclosure through the opening to form a cushion for use as a seat bottom, seat back, arm rest or headrest of a seating product.

A seating cushion formed using the preformed enclosure of the present invention is both highly comfortable and highly durable. Because the enclosure is formed separately from the pad, the characteristics of the enclosure can be varied independently of the pad without compromising the comfort of the seating cushion. Further, because the pad is not bonded to the enclosure, if the pad becomes compressed or otherwise unsuitable for use, or if the enclosure is somehow damaged, the pad and/or enclosure can be replaced without need to purchase an entire new seat.

In a preferred embodiment, the enclosure is formed in a two-sided mold, which allows the enclosure to be constructed with a consistent, repeatable and predetermined pattern of wall thickness. The two-sided mold also allows various shapes of enclosures, including enclosures having an overlapping lip. Also, because the enclosure is preformed into the desired three-dimensional shape, there are few of the wrinkles that result from utilizing a flat sheet of upholstery material to cover a pad. Although a cushion for a seat bottom is generally described herein and depicted in the figures, it should be understood that the seating cushion of the present invention may also be used to form back cushions, arm cushions, headrests and the like.

DETAILED DESCRIPTION OF PREFERRED EMBODIMENTS

Figure 1:
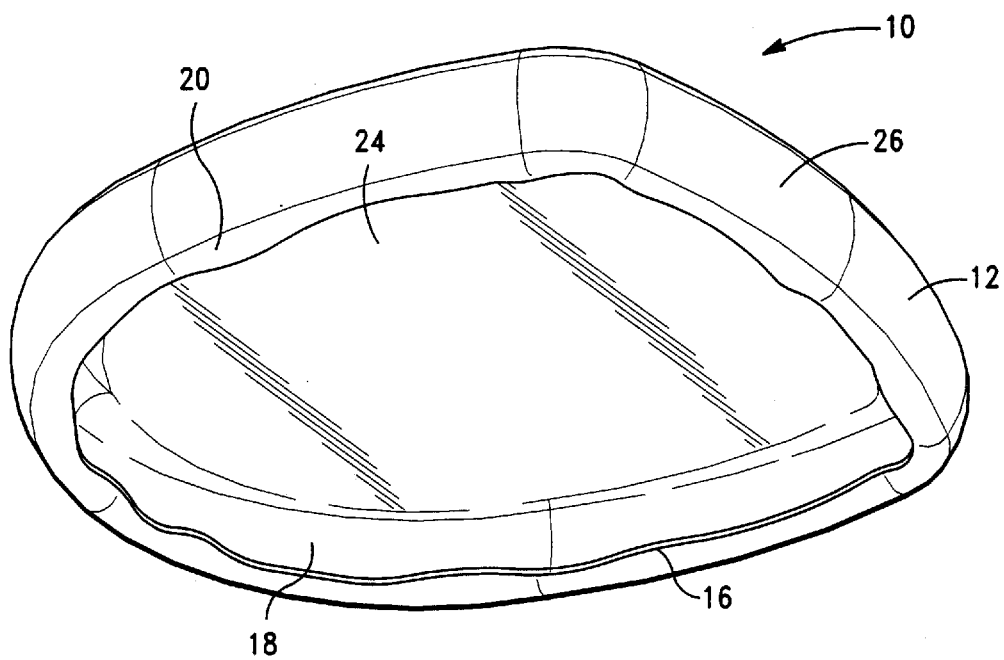
FIG. 1 is a perspective view of one embodiment of the preformed enclosure of the present invention.
Figure 2:
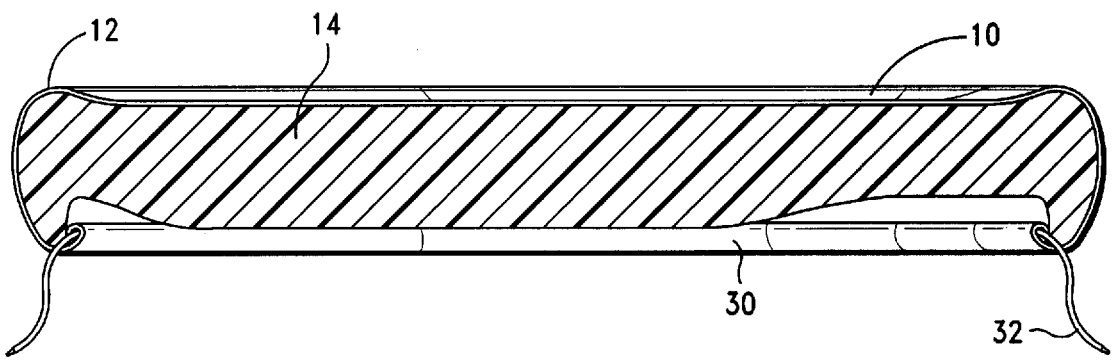
FIG. 2 is a cross-sectional view of the preformed enclosure of the present invention with a pad inserted therein taken along line 2—2 of FIG. 3, with the drawstring shown extending therefrom for clarity.
Figure 3:
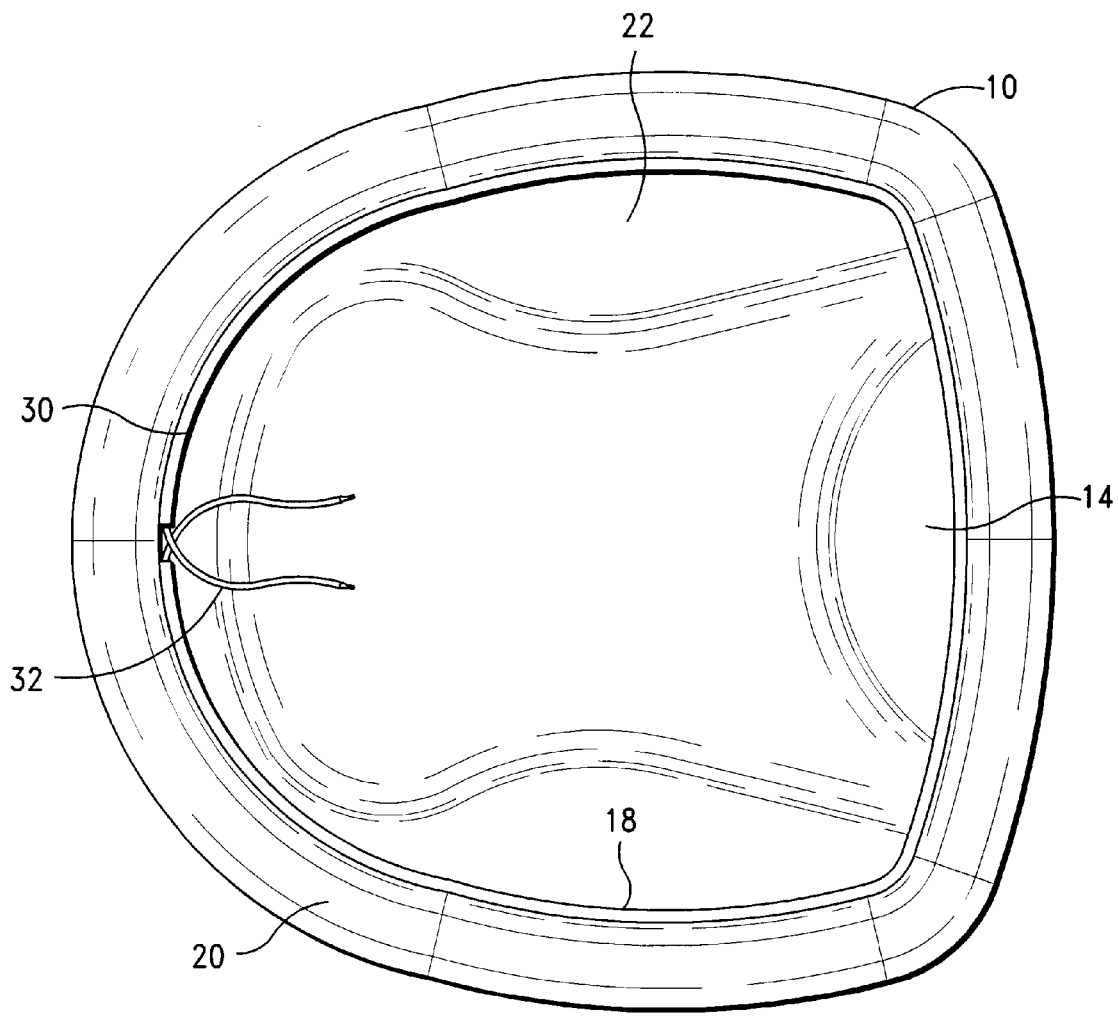
FIG. 3 is a bottom view of the preformed enclosure of FIG. 1 with a pad inserted therein.

Turning to FIG. 1, a preformed outer enclosure consistent with the present invention is generally designated by the numeral 10. Enclosure 10 comprises a unitary polymeric wall 12 configured to receive and cover a pad 14 therein, as shown in FIGS. 2 and 3. Enclosure 10 does not completely enclose pad 14. Instead, wall 12 of enclosure 10 terminates in a lower peripheral edge 16 that defines a lower opening 18 through which pad 14 may be inserted. The lower portion of wall 12 adjacent peripheral edge 16 forms a substantially horizontal lip 20. As best shown in FIG. 3, lip 20 covers a portion of the bottom surface 22 of pad 14 when pad 14 is installed within enclosure 10.

Wall 12 of enclosure 10 is generally thicker than conventional upholstery material, which adds durability and structure to the seating cushion. However, wall 12 is sufficiently thin and flexible that the user is able to feel pad 14 disposed within enclosure 10. Preferably, the thickness of wall 12 is between 0.030 and 0.250 inches, and most preferably wall 12 is between 0.060 and 0.100 inches thick. Wall 12 may be of uniform thickness or may be designed with a thickness that varies over different portions of enclosure 10.

The desired flexibility of enclosure 10 is obtained by forming enclosure 10 from a relatively flexible and durable material. Preferably, enclosure 10 is formed from a material having a density between 0.5 grams/cc and 1.3 grams/cc, more preferably between 0.7 grams/cc and 1.1 grams/cc and most preferably 0.80 grams/cc. Enclosure 10 formed from such material is durable, yet sufficiently soft and flexible to provide comfort to the user and to allow the user to feel pad 14 disposed therein. Preferably enclosure 10 is comprised of a polymeric composition and is more preferably formed from polyurethane. Elastameric or integral-skin polyurethane compositions consistent with the present invention are produced by Bayer Corporation under the mark BAYFLEX, and by DOW CHEMICAL COMPANY under the mark VORALAST.

The polymeric composition used to form enclosure 10 may additionally include various additives to alter the characteristics of enclosure 10 for certain intended environments. For example, antifungal, antibacteiral or antimicrobial agents may be included in the polymeric composition. Alternatively, enclosure 10 can be constructed to conduct electricity, and when combined with a suitable seat base, can form a seating product that dissipates static electricity for use in a microelectronics clean room or similar environment.

Returning to FIG. 1, wall 12 of enclosure 10 is preferably three-dimensional having a substantially horizontal top wall 24, a peripheral curved side wall 26 and lower horizontal lip 20. The dimensions of top wall 24 and side wall 26 will depend on the type of seating cushion desired, as can be readily calculated by one of ordinary skill in the art. In some instances, top wall 24 will flow directly into lip 20 with no side wall 26 therebetween. Lip 20 must be sufficiently wide to cover a portion of bottom surface 22 of pad 14, yet sufficiently narrow to allow pad 14 to fit through opening 18. Preferably the width of lip 20 ranges between 0.5 and 8 inches, more preferably between 1.5 and 2.5 inches.

Figure 4:
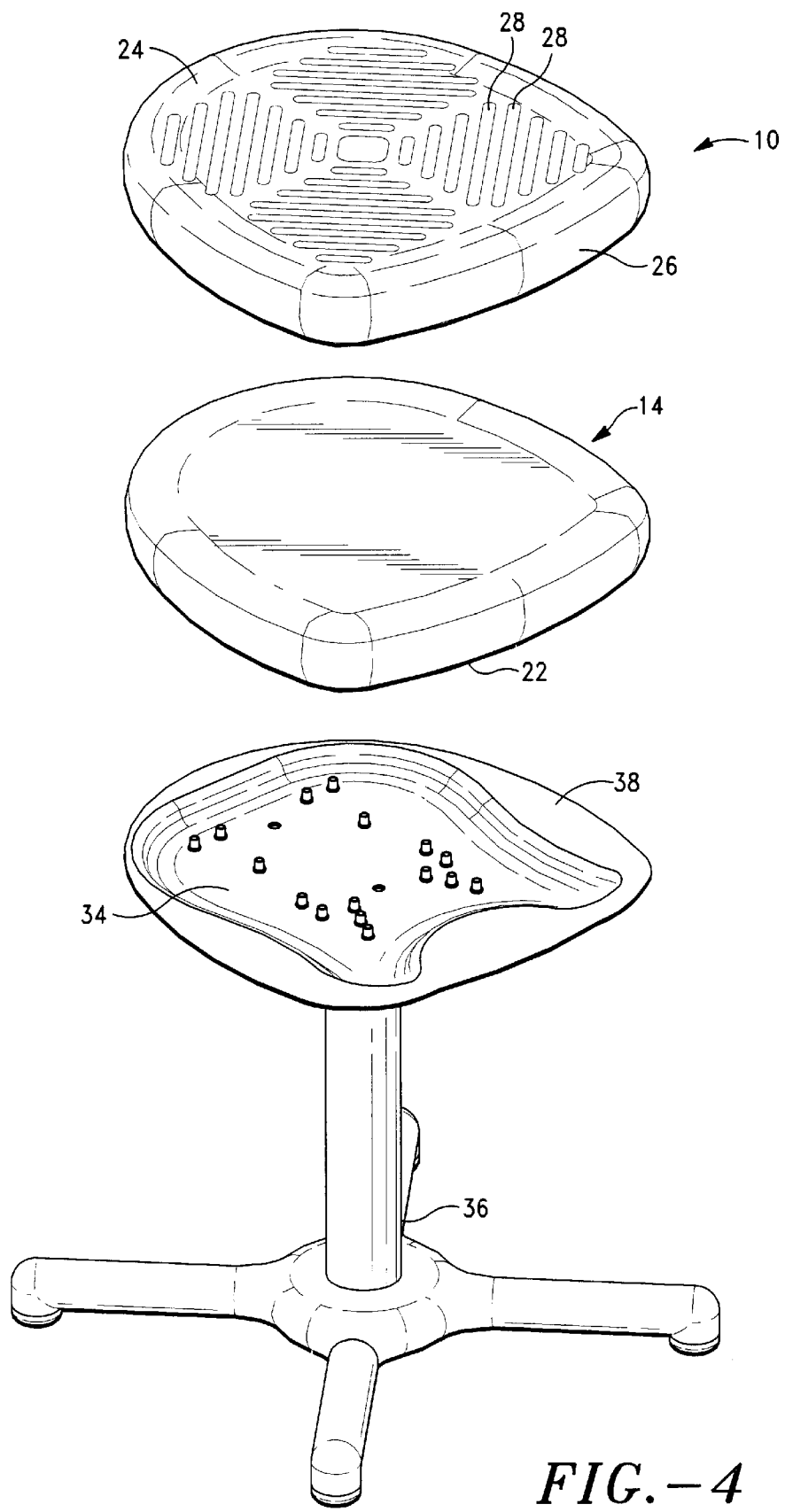
FIG. 4 is an exploded view of the preformed enclosure FIG. 1 associated with a pad, a base and a pedestal.

In the embodiment depicted in FIG. 4, the exterior surface of top wall 24 is provided with raised sections 28. Raised sections 28 provide traction to prevent the user from sliding on top wall 24 of enclosure 10. In addition, raised sections 28 define passageways that allow air to flow between the seating surface of the user and the top wall 24 of enclosure 10, thereby helping to prevent the user from becoming hot and sweating. Raised sections 28 may be of any suitable height and shape to help prevent slipping and/or provide air flow.

In a preferred embodiment best shown in FIGS. 2 and 3, a casing 30 containing a drawstring 32 is provided around opening 18. Preferably casing 30 is formed separately from enclosure 10 and is affixed to the exterior surface of lip 20 by any suitable fastener, preferably by stitching. Alternatively, casing 30 may be formed integrally with wall 12, for example by folding over peripheral edge 16 of wall 12 and securing it in place. When tightened and tied, drawstring 32 holds enclosure 10 snugly against pad 14 and secures pad 14 in place within enclosure 10. Because enclosure 10 is preformed to enclose pad 14, tightening drawstring 32 will produce only minor wrinkling in lip 20 of enclosure 10. Although casing 30 and drawstring 32 are shown in the figures, it should be understood that pad 14 may be held in place within enclosure 10 using any suitable means known in the art.

Pad 14 may be any resilient pad or cushion known in the art, preferably a preformed foam pad, and most preferably a preformed polyurethane foam pad. The characteristics of pad 14 will depend in part on the environment in which pad 14 will be used, as will be apparent to one in the art. For example, pad 14 may be formed with a contoured bottom surface 22, as shown in FIG. 3, to conform to the upper surface of base 34, depicted in FIG. 4. Because pad 14 is formed independently of enclosure 10, the characteristics of cushion 14 may be varied without compromising the durability or other characteristics of enclosure 10. Pad 14 may be removed from the enclosure and replaced without need to replace the enclosure.

Turning to FIG. 4, in a preferred embodiment a seating cushion comprising enclosure 10 and pad 14 further comprises a base 34 mounted on a pedestal 36. Enclosure 10 forms the exterior of the seating surface of the seating cushion. An upper edge 38 of base 34 is positioned within enclosure 10 adjacent to and overlapping a portion of lip 20 and closing opening 18. When tightened, drawstring 32, disposed within casing 30, holds base 34 in position relative to pad 14 and enclosure 10. Base 34 and pedestal 36 may be any standard seating components known in the art, and may be comprised of any suitable material known in the art such as metal, wood or plastic.

Base 34 may be attached to enclosure 10 and/or pad 14 by any fastening means known in the art. Preferably base 34 is removably attached to enclosure 10 to allow pad 14 to be removed from enclosure 10 without destroying enclosure 10. Base 34 may be removably attached to enclosure 10 using casing 30 and drawstring 32, using staples, or using any suitable removable fastening device. Additionally, base 34 may be removably attached to enclosure 10 utilizing a more permanent fastening means, such as glue. In such embodiment, base 34 and pad 14 may be removed by cutting base 34 from enclosure 10, while leaving a portion of lip 20 at the lower end of wall 12. Pad 14 may then be removed and a new pad inserted. Base 34 may then be re-attached to enclosure 10 utilizing the remaining portion of lip 20.

To form a seating cushion comprising enclosure 10, a polymeric composition, preferably polyurethane, is first molded into the desired preformed shape. Any desired additives should be added to the polymeric composition prior to molding. Enclosure 10 is preferably molded in a two-sided mold by injection molding or casting. The two-sided mold defines the shape and thickness of enclosure 10 in a manner that can not be achieved in spray or rotational molding.

Figure 5:
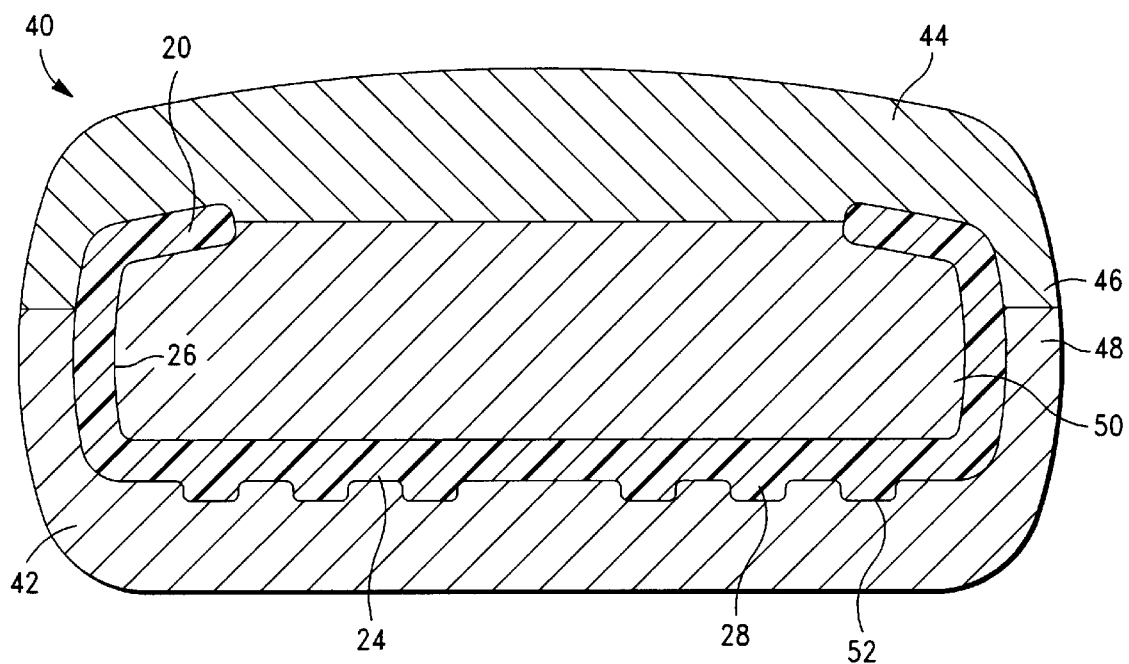
FIG. 5 is a cross-sectional view of a two-sided mold that may be used to form the preformed enclosure of FIG. 1.

Turning to FIG. 5, the two-sided mold utilized to form the enclosure in a preferred embodiment is generally shown by the number 40. Mold 40 comprises a concave base 42 that defines the shape of the exterior surface of top wall 24 and upper portion of side wall 26. The two-sided mold further comprises a concave lid 44 that defines the shape of the exterior surface of the lower portion of side wall 26 and lip 20. Mold lid 44 is designed to be lowered onto mold base 42, such that the lower edge 46 of lid 44 rests on the upper edge 48 of base 42 and a seal can be formed around the periphery of the edges of lid 44 and base 42. When lid 44 is in place on base 42, the interior surfaces of lid 44 and base 42 define the exterior surface of enclosure 10.

A generally egg-shaped interior form 50 extending from lid 44 defines the shape of the interior surface of enclosure 10. Lid 44 and interior form 50 are designed such that when lid 44 is lowered onto base 42, there is a space between the lower surface of form 50 and the interior surface of base 42 and a space between the upper surface of form 50 and lid 44. Thus, when lid 44 and form 50 are lowered into place on base 42, the concave base 42 and lid 44 define the exterior of enclosure 10, and egg-shaped form 50 defines the interior of enclosure 10, such that the space between the interior form 50 and the exterior base 42 and lid 44 corresponds to the desired shape of enclosure 10. Opening 18 is formed where interior form 50 extends from lid 44.

To mold enclosure 10, the polymeric composition is poured into base 42. As lid 44 is lowered, the polymeric composition is displaced by interior form 50 to fill the space between the interior form 50 and the exterior base 42 and lid 44. As previously described, prior to pouring the polymeric composition into the mold, a foaming agent may be added to the polymeric composition to cause the polymeric composition to expand to assure that all spaces between the interior form 50 and the exterior base 42 and lid 44 are filled with polymeric composition. Any foaming agent known in the art is suitable for this purpose.

By utilizing a two-sided mold, enclosure 10 can be formed accurately in a consistent and repeatable predetermined thickness with angles and overhanging sections, such as lip 20. Two-sided molds may be constructed to produce various shapes of enclosures. For example, the two-sided mold may be constructed such that the thickness of enclosure 10 varies in an accurate and predetermined pattern. Further, the base 42 may be provided with cavities 52 to form raised sections 28 on the exterior surface of top wall 24. If overhanging sections are not required, the two-sided mold may be comprised of only a concave base 42 and a complimentary convex lid, with no interior form. In addition, use of a two-sided mold minimizes waste and does not produce harmful airborne chemicals that are produced by spray molding polyurethane.

When the polymeric composition has cured, mold lid 44 is raised, and enclosure 10 is removed from the interior form 50 of the mold. A preformed pad 14 is placed within enclosure 10. Preferably, casing 30 containing drawstring 32 is fastened in place on the exterior surface of lip 20 of wall 12 around opening 18. Pad 14 is secured in place within enclosure 10, and opening 18 of enclosure 10 is closed. Preferably, pad 14 is secured in place and opening 18 is closed by inserting upper edge 38 of base 34 into opening 18 to close opening 18, tightening drawstring 32 to pull enclosure 10 snugly around pad 14, and tying drawstring 32 to hold base 34 and pad 14 in place relative to each other and enclosure 10.

From the foregoing it will be seen that this invention is one well adapted to attain all ends and objectives hereinabove set forth, together with the other advantages which are obvious and which are inherent to the structure.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method for forming an upholstered seat cushion, comprising:

molding in a two-sided mold an enclosure for a resilient preformed seating pad, said enclosure comprising a unitary wall terminating in a peripheral edge to define an opening and a substantially horizontal lip adjacent said peripheral edge;

removing said enclosure from said mold;

placing the resilient preformed seating pad within said enclosure through said opening; and securing said pad in place within said enclosure.

2. A method for forming an upholstered seat cushion, comprising:

molding in a two-sided mold a polymeric enclosure for a resilient preformed seating pad, said enclosure comprising a unitary wall having a thickness of at least 0.030 inches terminating in a peripheral edge to define an opening;

removing said enclosure from said mold;

placing the resilient preformed seating pad within said enclosure through said opening; and securing said pad in place within said enclosure.

3. The method for forming a cushion as claimed in claim 2, wherein said molding step comprises molding said enclosure as a unitary wall having a thickness of between 0.030 and 0.250 inches.

4. The method for forming a cushion as claimed in claim 2 wherein said molding step comprises molding said enclosure from a polymeric composition having a density ranging between 0.5 gms/cc and 1.3 gms/cc.

5. The method for forming a cushion as claimed in claim 2 wherein said molding step comprises molding said enclosure from a polymeric composition comprising polyurethane.

6. The method for forming a cushion as claimed in claim 2 wherein said molding step comprises molding said enclosure from a polymeric composition comprising polyurethane, wherein said polymeric composition has a density ranging between 0.5 gms/cc and 1.3 gms/cc.

7. The method for forming a cushion as claimed in claim 2 wherein said molding step comprises molding said enclosure from a polymeric composition comprising polyurethane and a foaming agent.

8. The method for forming a cushion as claimed in claim 2 wherein said molding step comprises molding said enclosure from a polymeric composition comprising polyurethane, a foaming agent, and additives.

9. The method for forming a cushion as claimed in claim 2 wherein said molding step comprises molding said enclosure from a polymeric composition comprising polyurethane and additives.

10. The method for forming a cushion as claimed in claim 9 wherein said molding step comprises molding said enclosure from said polymeric composition comprising polyurethane and additives, wherein said additives are selected from the group consisting of anti-fungal agents, anti-bacterial agents, and anti-microbial agents.

11. A method for forming an upholstered seat cushion, comprising:

molding in a two-sided mold a polymeric enclosure for a resilient preformed seating pad, said enclosure comprising a unitary wall having a predetermined thickness and terminating in a peripheral edge that defines an opening;

removing said enclosure from said mold;

placing the resilient preformed seating pad within said enclosure through said opening; and securing said pad in place within said enclosure.

12. A method for forming an enclosure for an upholstered seat cushion comprising the step of molding in a two-sided mold an enclosure having a unitary wall terminating in a peripheral edge that defines an opening through which a pad may be inserted, wherein said two-sided mold comprises a concave base and a concave lid, and wherein said enclosure has a substantially horizontal top surface, a peripheral side wall extending from said top surface and a horizontal lip extending from said side wall.

13. The method of forming an enclosure as claimed in claim 12 wherein said molding step comprises molding said enclosure in said two-sided mold, wherein said concave base defines an exterior surface of said top surface and of an upper portion of said side wall, and said concave lid defines an exterior surface of a lower portion of said side wall and of said lip.

14. The method of forming an enclosure as claimed in claim 13, wherein said molding step comprises pouring a polymeric composition into said concave base and lowering said concave lid onto said concave base such that a lower edge of said concave lid rests on an upper edge of said concave base to form a seal around a periphery of the upper and lower edges of said concave base and said concave lid, respectively.

15. The method of forming an enclosure as claimed in claim 14 wherein said molding step comprises molding said enclosure in said two-sided mold wherein said two-sided mold additionally comprises an egg-shaped interior form extending from said concave lid.

16. The method of forming an enclosure as claimed in claim 15 wherein said molding step comprises pouring said polymeric composition into said concave base and lowering said concave lid onto said concave base such that a lower edge of said concave lid rests on an upper edge of said concave base to form a seal around a periphery of the upper and lower edges of said concave base and said concave lid respectively, and wherein said concave base and said concave lid define an exterior, and said egg-shaped interior form defines an interior surface of said enclosure.

* * * * *